United States Patent [19]
Meyer et al.

[11] Patent Number: 6,076,565
[45] Date of Patent: Jun. 20, 2000

[54] ADHESIVE FASTENER AND METHOD

[75] Inventors: Engelbert A. Meyer, Sun City, Calif.; Drew J. Smith, Bloomfield Hills; Theodore J. Sweeney, Jr., Grosse Pointe Farms, both of Mich.

[73] Assignee: Theodore Sweeney & Company, Clinton Township, Mich.

[21] Appl. No.: 09/123,674

[22] Filed: Jul. 28, 1998

Related U.S. Application Data

[63] Continuation-in-part of application No. 08/907,720, Aug. 8, 1997.

[51] Int. Cl.[7] .................................................. B65B 1/04
[52] U.S. Cl. ..................... 141/1; 141/2; 141/4; 141/5; 141/7; 141/8; 141/39; 141/59; 141/64; 141/67; 141/129; 222/389
[58] Field of Search .................................. 141/1, 2, 4, 5, 141/7, 8, 39, 59, 61, 64, 67, 100, 104, 129; 222/386, 389

[56] References Cited

U.S. PATENT DOCUMENTS

| | | |
|---|---|---|
| 3,960,187 | 6/1976 | Stock et al. .................................. 141/1 |
| 4,273,827 | 6/1981 | Sweeney et al. . |
| 4,555,206 | 11/1985 | Sweeney . |
| 4,693,286 | 9/1987 | Lock et al. ................................ 141/61 |
| 4,693,652 | 9/1987 | Sweeney . |
| 4,830,558 | 5/1989 | Sweeney . |
| 5,044,852 | 9/1991 | Sweeney et al. . |
| 5,277,530 | 1/1994 | Sweeney, Sr. et al. . |
| 5,584,630 | 12/1996 | Sweeney, Sr. et al. . |
| B1 5,044,852 | 4/1995 | Sweeney et al. . |

FOREIGN PATENT DOCUMENTS

| | | |
|---|---|---|
| 614955 | 2/1988 | Australia . |
| 8807892 | 3/1994 | Brazil . |
| 0401212 | 1/1995 | European Pat. Off. . |
| 0401212 | 4/1995 | Italy . |
| 63502631 | of 0000 | Japan . |
| US 88 00499 | 8/1989 | WIPO . |

*Primary Examiner*—Henry J. Recla
*Assistant Examiner*—Timothy L. Maust
*Attorney, Agent, or Firm*—Brooks & Kushman P.C.

[57] ABSTRACT

An adhesive fastener for securement to a substrate which has a reservoir comprising a reservoir cup and a piston located therein blocking entry of atmospheric water vapor and preventing unintentional leakage of adhesive from the reservoir and a wall portion of the reservoir may be displaced to prevent hydraulic lock as the piston is pushed into the reservoir during assembly of the fastener and also when the fastener is being deployed against the substrate. Apparatus and a method of filling the reservoir cups and inserting pistons therein while excluding atmospheric water vapor is disclosed.

5 Claims, 9 Drawing Sheets

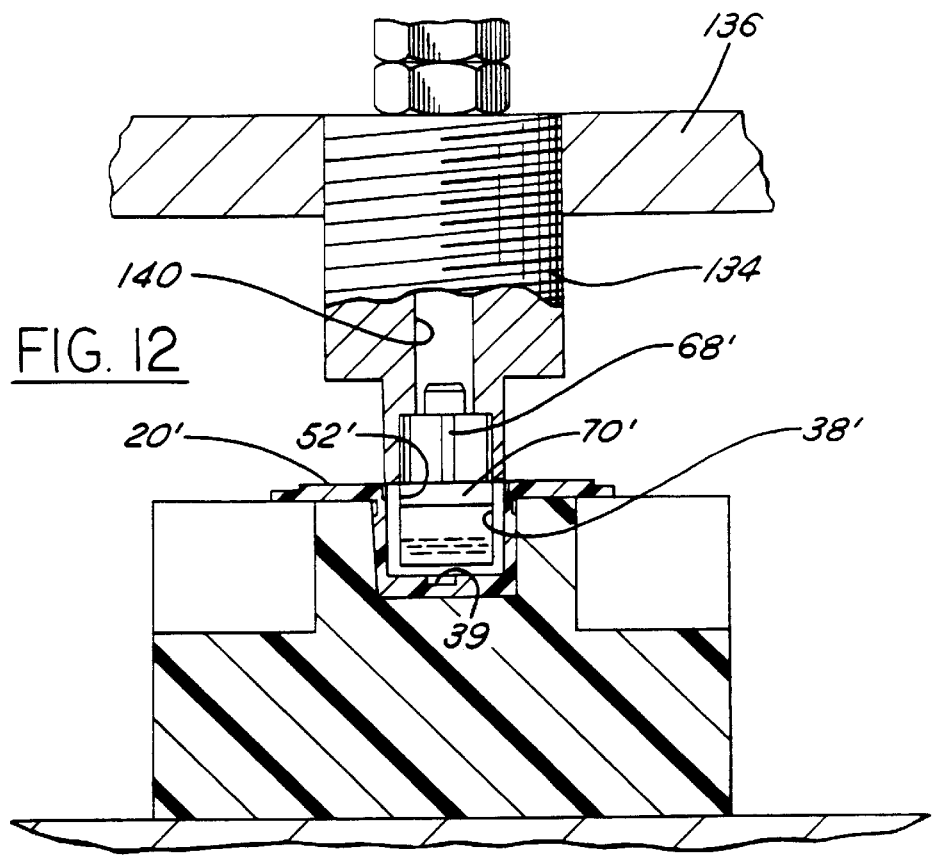
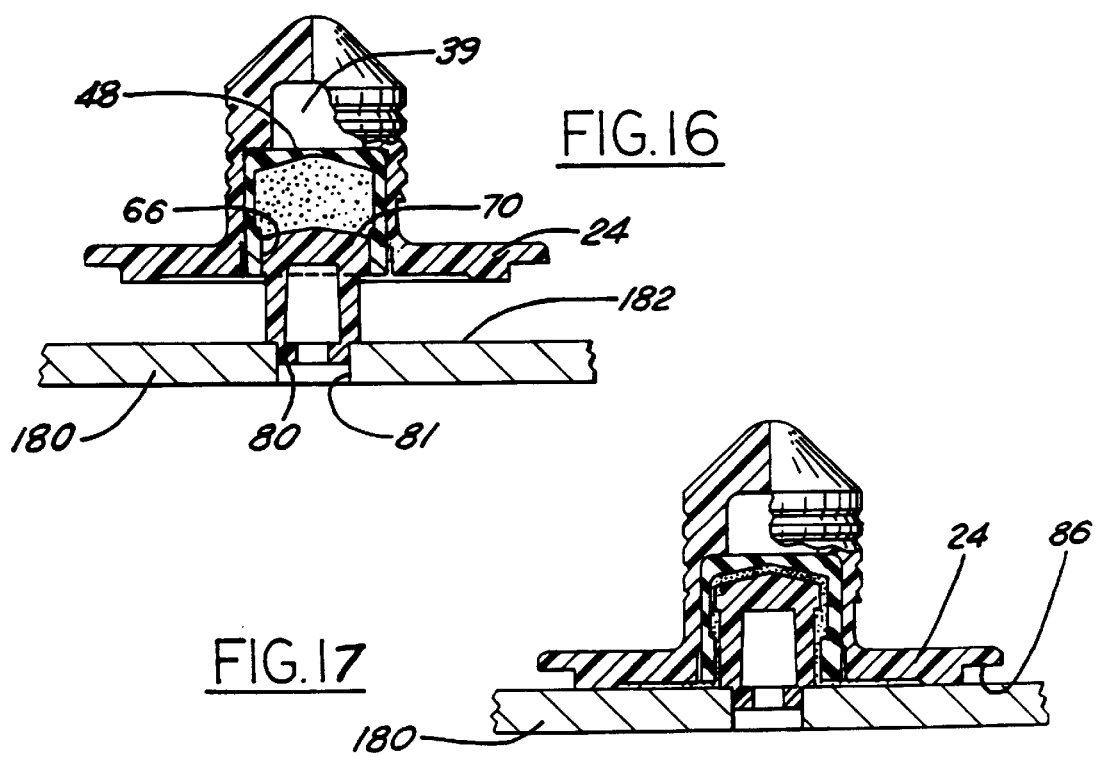

ADHESIVE FASTENER AND METHOD

RELATED APPLICATION

This is a continuation-in-part of U.S. application Ser. No. 08/907,720 filed Aug. 8, 1997.

TECHNICAL FIELD

The present invention relates to fasteners utilizing quick setting adhesives and to methods of filling such fasteners with such adhesives.

INCORPORATION BY REFERENCE

U.S. Pat. Nos. B1 5,044,852, 5,584,630 and 5,277,530 are incorporated by reference.

BACKGROUND OF THE INVENTION

In U.S. Pat. Nos. B1 5,044,852, 5,584,630 and others, fasteners are disclosed which utilize quick-setting adhesives, such as anaerobic or cyanoacrylate adhesives. The fasteners are so designed that upon pressing them against a substrate to which the fasteners are to be attached, the adhesive is automatically dispensed into the interface between the fastener and the substrate and in but moments, the fastener is securely attached to the substrate.

The adhesive is contained in a reservoir in the fastener. The reservoir is made from a material which is intended neither to react with nor promote curing of the adhesive therewithin. The remainder of the fastener is intended to bond with the adhesive as the latter cures and may be formed of a rigid plastic. Examples of suitable plastics are found in U.S. Pat. No. 5,277,530.

It has been discovered that in some instances the adhesive has tended to cure in the reservoir notwithstanding the non-reactive character of the reservoir material, particularly if the loaded reservoir in a fastener is stored for a long interval. For example, an adhesive such as a cyanoacrylate, must have atmospheric water vapor excluded if premature curing is to be prevented. On the other hand, if an anaerobic adhesive is used, oxygen must be present to prevent premature curing. Accordingly, studies of these problems have indicated that the water vapor in the ambient atmosphere is apparently captured in the reservoir at the time it is filled with the adhesive and/or the piston is inserted in the reservoir cup and will cause premature curing of cyanoacrylate adhesives, while it becomes important to include oxygen in the reservoir of fasteners utilizing anaerobic adhesives.

After a reservoir cup is filled with the proper amount of adhesive, a piston is inserted in the open end to seal the interior. It has been found that a hydraulic lock may occur preventing insertion of the piston into the reservoir cup which prevents the piston from properly seating in the cup. Such lock can also prevent further displacement of the piston into the cup to expel the adhesive, or create a buildup of excessive pressure within the reservoir leading to a squirting out of the adhesive as the fastener is applied to a substrate to which it is to be attached.

Accordingly, modifications of both the reservoir and the fastener have been found desirable as well as the methods of charging the reservoir cup with adhesive and inserting the piston therein.

SUMMARY OF THE INVENTION

To avoid the inclusion of undesired gasses in the reservoir and at the same time overcome the aforementioned hydraulic lock the reservoir cup is flushed prior to and during filling with a bath of a suitable gas, depending on the type of adhesive to be stored in the reservoir. Such bath may be continued until the piston is inserted and properly seated in the reservoir cup.

At the same time, a small quantity of such gas is trapped between the piston and the free surface of the adhesive, which acts as a compressible bubble allowing the piston to be inserted into the reservoir cup thereby avoiding the aforementioned hydraulic lock.

In addition to providing a compressible bubble to overcome hydraulic lock, the reservoir itself is configured to expand to accommodate increased pressure as the piston is pressed into the reservoir cup. This is particularly desirable as the piston is depressed from the storage position to the adhesive expelling position. In the storage position the piston and cup have interfitting smooth wall portions which act as a valve preventing ingress of atmospheric water vapor or egress of the adhesive from the reservoir. As the piston is depressed further into the reservoir cup to open the valving action between the cup and the piston to expel the adhesive from the cup, the design is such that one or more wall portion of the reservoir will be displaced momentarily to accommodate the increased pressure and avoid an uncontrolled squirting or spurting of the adhesive from the cup into the interface between the fastener and the substrate to which the fastener is to be attached.

Also disclosed is a method and apparatus for charging the reservoir cups with adhesive and inserting the pistons to seal the same for storage pending use.

BRIEF DESCRIPTION OF THE DRAWINGS

FIG. 12 is a cross-sectional view taken on the line 12—12 of FIG. 11 through the apparatus for inserting the piston into the fastener showing the piston entered into the reservoir cup and located at the storage position, the fastener being of a slightly modified form;

FIG. 16 is a cross-sectional view through a fastener of the kind shown in FIG. 1 being applied to a substrate and showing the piston being depressed into the reservoir cup and before the valve opens releasing adhesive from the reservoir; and FIG. 17 is a cross-sectional view through the fastener of FIG. 16 after securement to the substrate.

BRIEF DESCRIPTION OF THE PREFERRED EMBODIMENT

Figure 1:
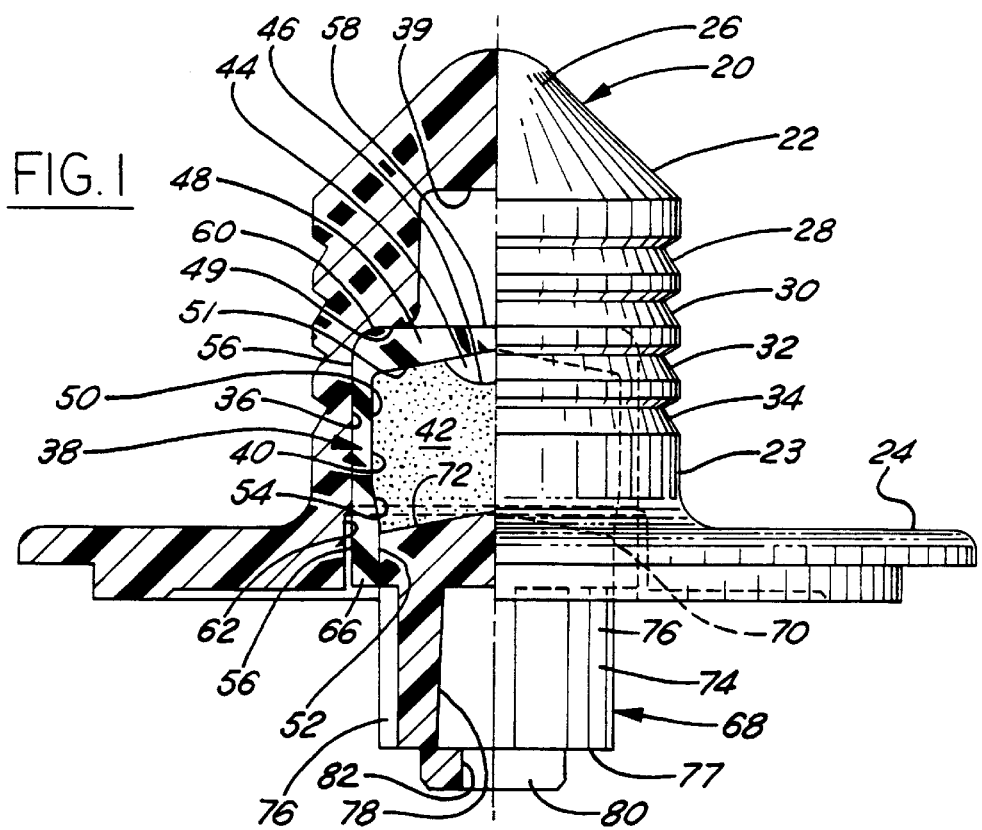
FIG. 1 is a side elevational view of one form of a fastener ready for deployment, with the fastener shown partially in section.
Figure 2:
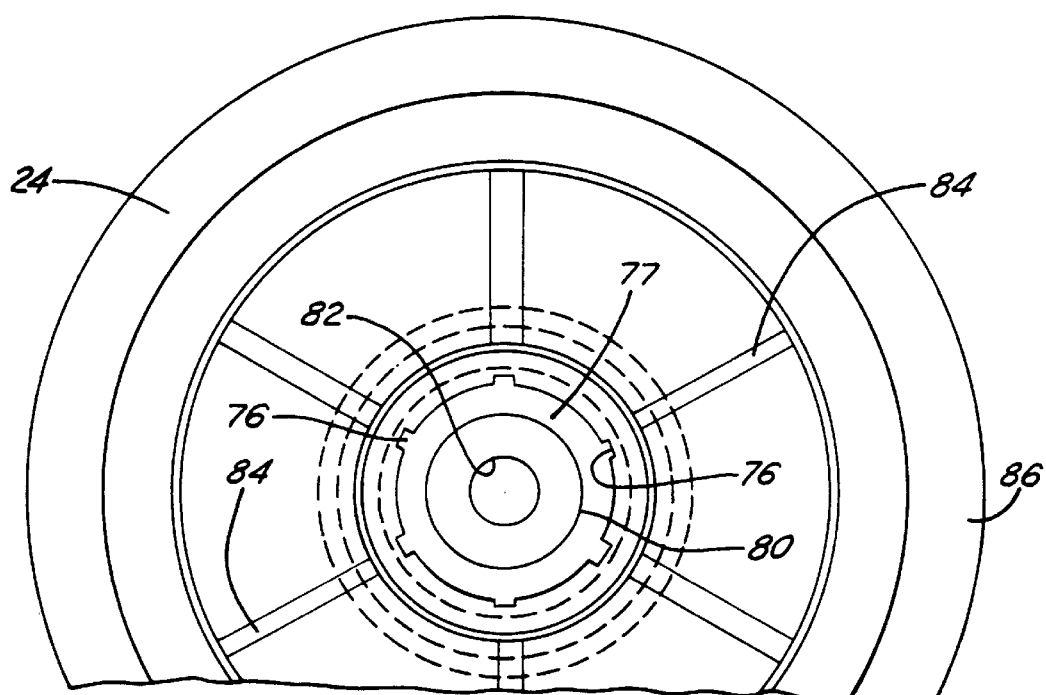
FIG. 2 is bottom view of the fastener shown in FIG. 1.

FIGS. 1 and 2 show a fastener 20 generally similar to that shown in U.S. Pat. No. B1 5,044,852 which is ready for deployment against a substrate (not shown) to which the fastener is to be secured. Reference should be made such patent for background explanation of the fastener 20.

As used herein the term "fastener" includes an assembly of a fastener body 22 and a reservoir comprising a reservoir cup 38 and a piston or plunger 68. When the reservoir is charged with adhesive, ready for deployment against a substrate, the adhesive is shown at 42 in the reservoir.

As disclosed in FIGS. 1 and 2, the fastener body 22 includes a barrel portion 23 and a flange portion 24. The flange may be flat as shown herein and in U.S. Pat. No. 5,584,630, or in the form of a cone as in U.S. Pat. No. B1 5,044,852. The exterior of the barrel portion may be of a variety of configurations depending upon the way in which the fastener is to be used. In the illustrative embodiment of FIGS. 1, 16 and 17, the barrel is cylindrical with a conical nose 26 and a series of circumferential grooves 28, 30, 32 and 34 which may be utilized to secure another part to the barrel. The fastener body is hollow to provide a first cylindrical recess 36 opening into a smaller diameter recess 39. The larger recess receives the adhesive reservoir cup 38. The cup has a cavity 40 within which the adhesive 42 is disposed. A gas bubble 44 is disposed above a free surface 46 of the adhesive and the overlying wall 48 of the reservoir cup.

It will be noted that the reservoir cup 38 is of generally cup-shaped configuration with an interior cylindrical wall 50 terminating in an end wall 48 which may have a conical inner surface 51 in the embodiment of FIGS. 1, 16 and 17. Such end wall bears against a shoulder 49 of the fastener body. The opposite end of the reservoir cup opens outwardly through a cylindrical surface 52 of a somewhat smaller diameter than that of the cylindrical wall 50. The surface 52 and cylindrical wall 50 are joined by a sloping connecting wall surface 54.

The exterior of the reservoir cup in the illustrative embodiments is cylindrical as at 56 terminating at one end in a flat surface 58 with the wall portions 56 and 48 joined in a radius corner 60. Adjacent the mouth portion 66 of the cup the fastener cavity is slightly enlarged as at 62 to provide a gap between the exterior surface 56 of the reservoir cup and the encircling surface 62 of the fastener body. This gap enables the mouth portion 66 of the reservoir cup to expand radially (and circumferentially) as the piston 68 is inserted in the cup. This helps to prevent a hydraulic lock from forming during initial insertion of the piston in the cup. The smooth surface 52 at the mouth of the reservoir cup and the land 70 on the piston cooperate to form a valve preventing leakage from the reservoir and also preventing entry of ambient atmosphere into the reservoir. The surfaces 52 and 70 are a press-fit and are of matching cylindrical shape.

Piston 68 may have a conical inner end 72 matching the inner surface 51 of the reservoir. The main body 74 of the piston is exteriorly provided with circumferentially spaced, longitudinal grooves 76 extending from land 70 to the outer or lower end face 77 and is interiorly hollow as at 78. The lower end face of the piston optionally exhibits a locating nose portion 80 through which extends a passageway 82 enabling communication of the hollow interior 78 of the piston with the ambient atmosphere. The locating nose 80 is intended to enter a hole 81 in a substrate to which the fastener is to be attached as shown in FIGS. 16 and 17. The exterior diameter of the piston 68 corresponds to that of the land 70 and the grooves 76 extend radially inwardly from such diameter. The grooves enable adhesive 42 within the reservoir to be expelled therefrom upon inward displacement of the piston to the point where the inner ends of the grooves 76 adjacent the land 70 communicate with the reservoir cavity 40 at the inner side of the mouth wall 52, i.e. at the sloping wall 54 of the reservoir cavity.

In FIG. 16, the piston is pressed into the cavity beyond the position shown in FIG. 1 but not sufficiently to open the valve, and the mouth portion 66 of the reservoir cup flexes outwardly within the gap 64. In addition the end wall 48 of the reservoir cup may bulge outwardly into the recess 39 as pressure within the cup increases. This is shown in FIG. 16. The gas bubble 44 may also be compressed. The flexing of the reservoir and/or compression of the bubble serve to permit the land 70 of the piston to bypass the complementary smooth surface 52 at the mouth of the reservoir cavity. Thus, the surfaces 52 and 70 cooperate when the piston is at the position shown in FIGS. 1 and 16 to form a valve as aforesaid. Just beyond the position shown in FIG. 16, the valve opens and adhesive flows out of the reservoir through the grooves 76 as the piston is fully depressed until the fastener bottoms on the substrate as shown in FIG. 17.

Thus, the reservoir has a flexible wall portions that will flex in response to increased pressure within the reservoir as the piston is depressed to open the valve, and a hydraulic lock is thereby prevented. In FIG. 16, the mouth portion 66 of the reservoir cup is shown bulging radially outwardly and the valve is just about to open.

An advantage of this arrangement is that it prevents the build-up of internal pressure within the reservoir sufficient to cause the adhesive to squirt uncontrollably therefrom. As will be noted from FIG. 16, there is a period of time when the flange 24 has not yet reached the surface 182 of the substrate 180. During this interval, it is desirable to avoid spurting of the adhesive toward the surface 182 with such force as to cause escaping of adhesive beyond the interface of the flange with the substrate.

Preferably, there is a slight interference fit between the exterior of the reservoir cup 38 and the interior surface of the fastener cavity 36 sufficient to prevent the reservoir from falling out of the fastener body 22 during assembly, handling, storage and application of the fastener to the substrate to which it is attached.

Distribution channels 84 may be provided on the underside of the flange 24 to facilitate distribution of the adhesive as described more completely in U.S. Pat. No. B1 5,044,852. In addition, the flange may be provided with a peripheral overhang at 86 to reduce the likelihood of contact between the adhesive 42 and any adjacent object when the same is expelled into the interface between the fastener and a substrate to which it is to be secured.

Figure 3:
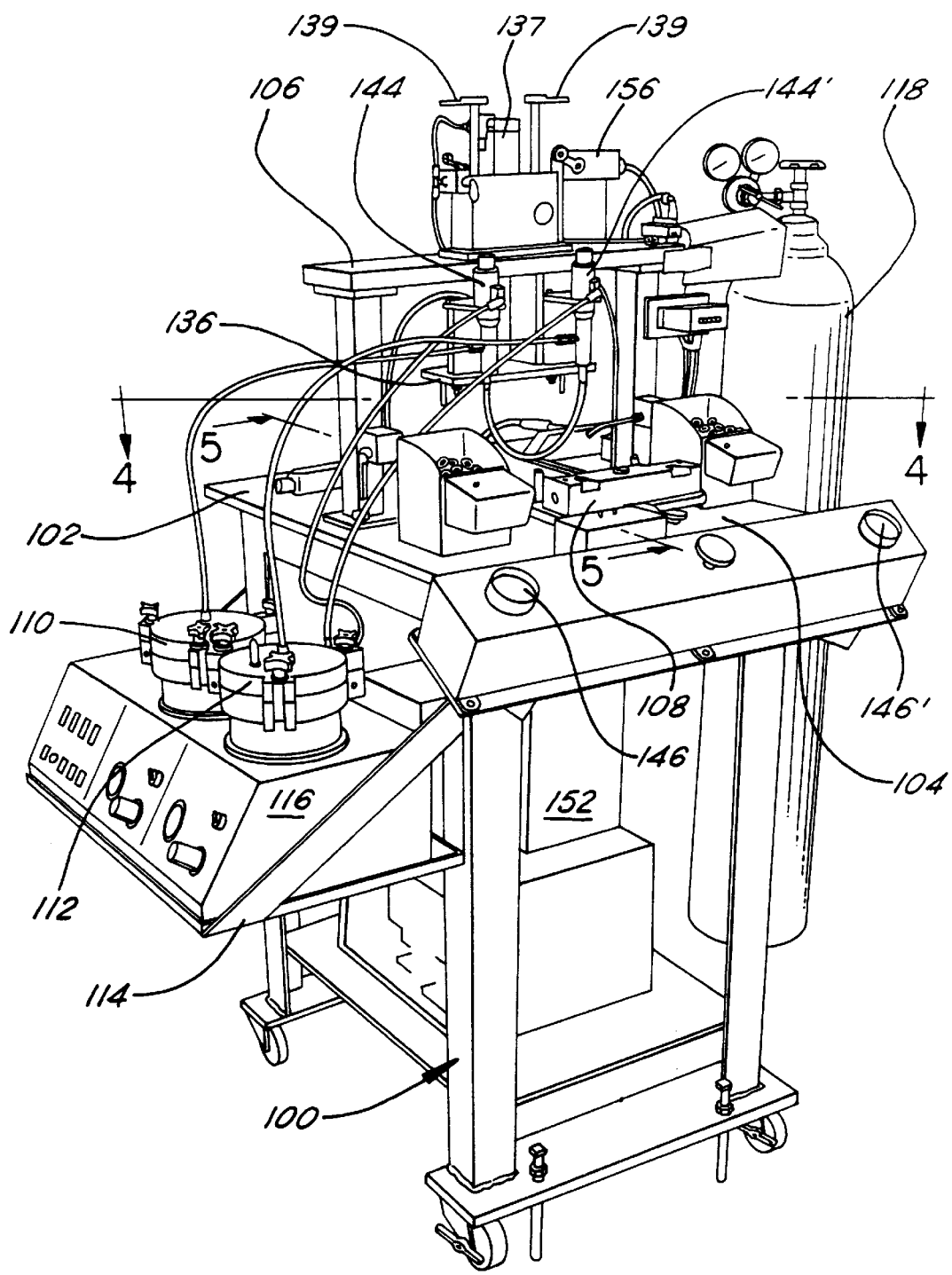
FIG. 3 is a perspective view of apparatus for filling the fasteners with adhesive.

In FIG. 3, we have shown apparatus for filling the reservoir cup and placing the plunger or piston therein in a position readying the fastener for deployment of the adhesive therefrom upon being pressed against a substrate. The apparatus shown in FIG. 3 is a prototype and the operations carried out by the same are partially automatic and partially manual. It will be understood by those skilled in the art upon reviewing the following description that the apparatus of FIG. 3 may be fully automated by the use of suitable controls and robotic devices.

Figure 14:
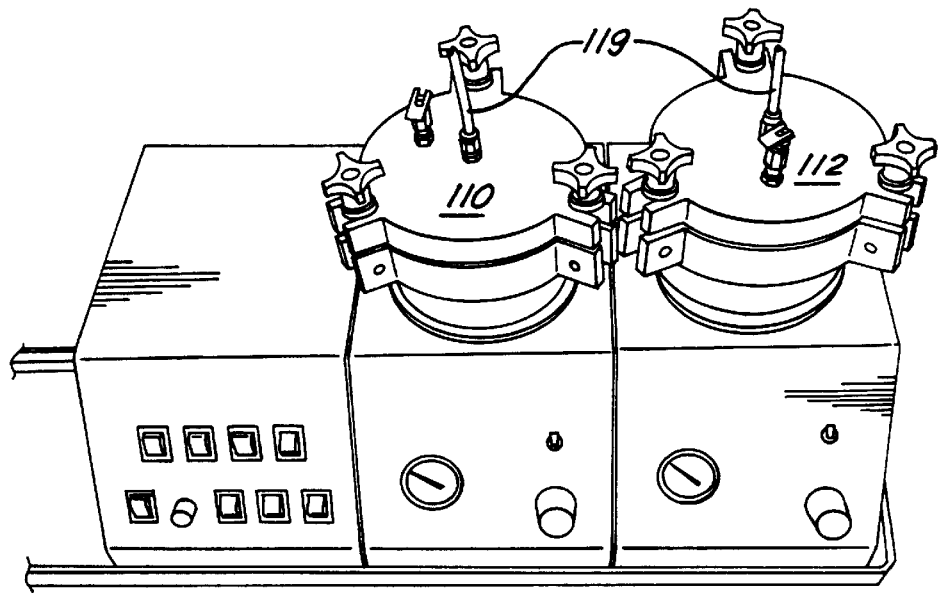
FIG. 14 is a perspective view of adhesive containers for use with the apparatus of FIG. 3.

The apparatus 100 comprises a wheeled stand or table 102 to facilitate moving the apparatus to suitable locations within a plant or other facility. The upper surface 104 of the table supports the filling mechanism 106 including the slide 108. The adhesive is contained within pressurized containers 110 and 112 carried by a shelf 114 fastened to one side of the wheeled table 102. Such containers are part of associated apparatus 116 manufactured by Locktite Corporation of Hartford, Conn., U.S.A., and sold under the trademark ZETA and are conventional. A source of dry nitrogen or other gas is provided by the pressurized cylinder 118. Such gas is delivered by lines 119 (see FIG. 14) to the containers 110 and 112 to pressure the adhesive therein so it may be delivered through lines to the fill nozzle as hereafter described.

Figure 4:
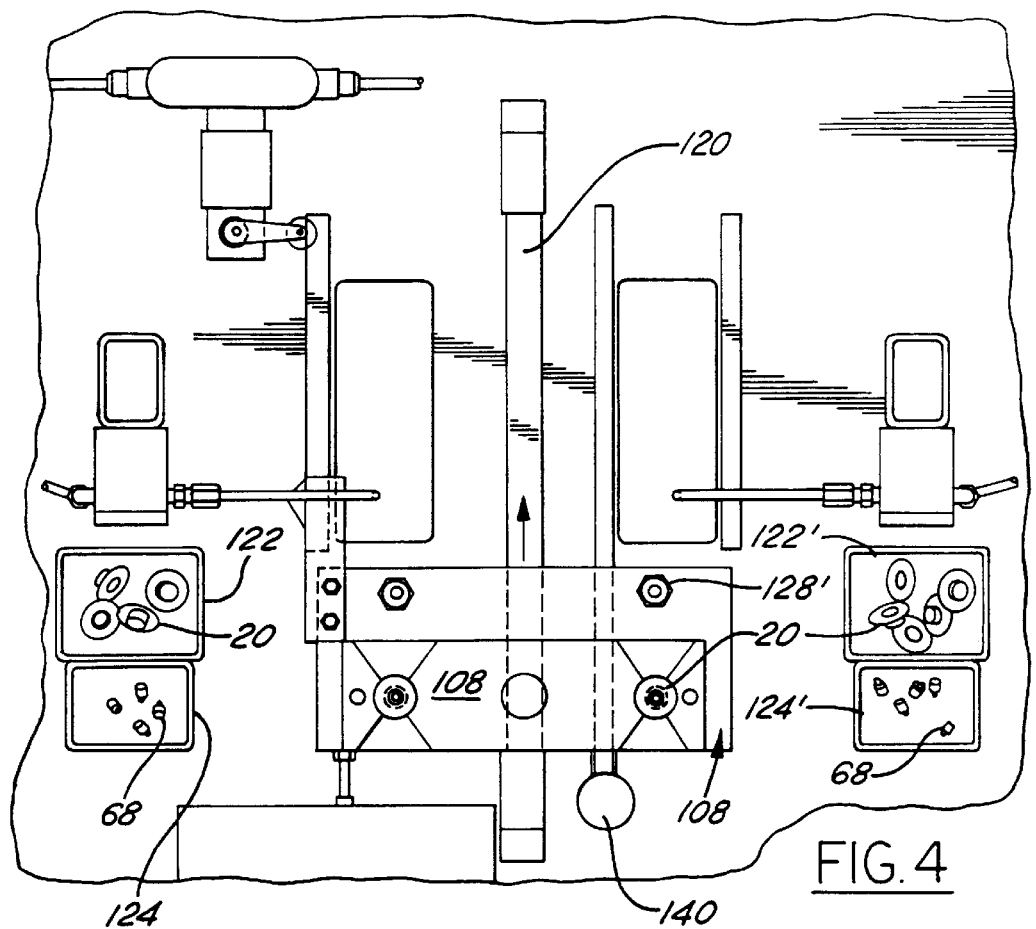
FIG. 4 is a top view of the apparatus of FIG. 3 taken substantially along the plane 4—4 thereof.
Figure 5:
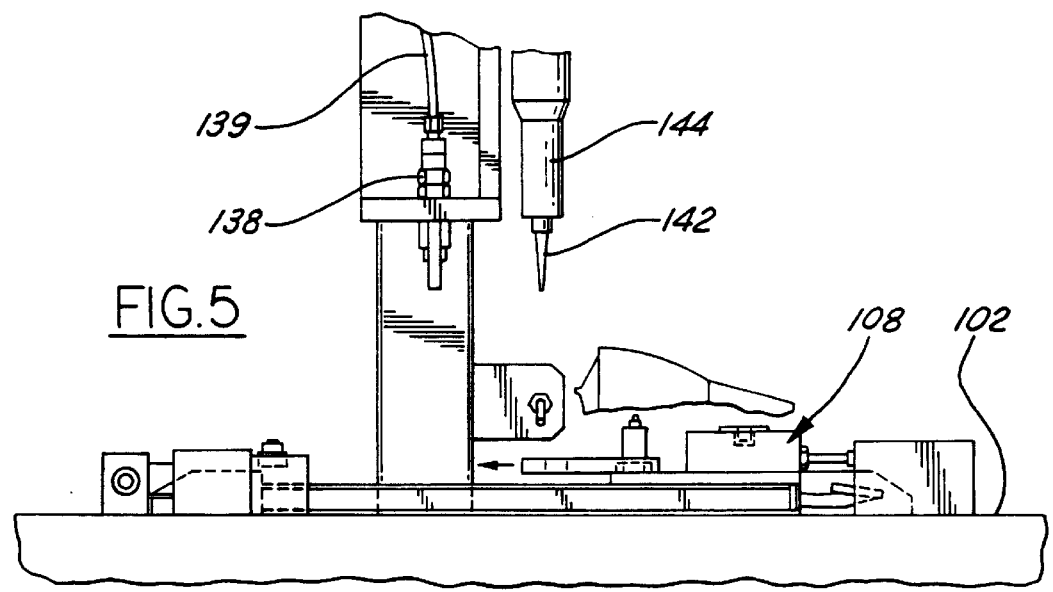
FIG. 5 is a side view of the apparatus of FIG. 3 taken substantially along the line 5—5 thereof.
Figure 6:
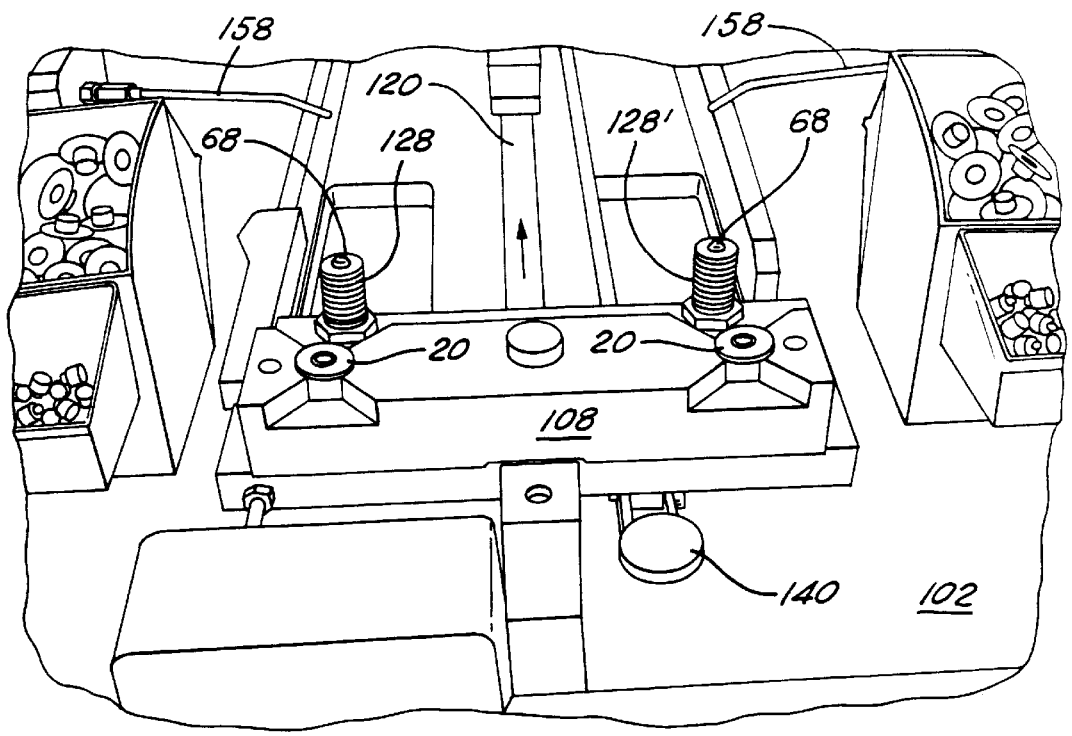
FIG. 6 is a perspective view looking down on the slide mechanism at the loading station.
Figure 7:
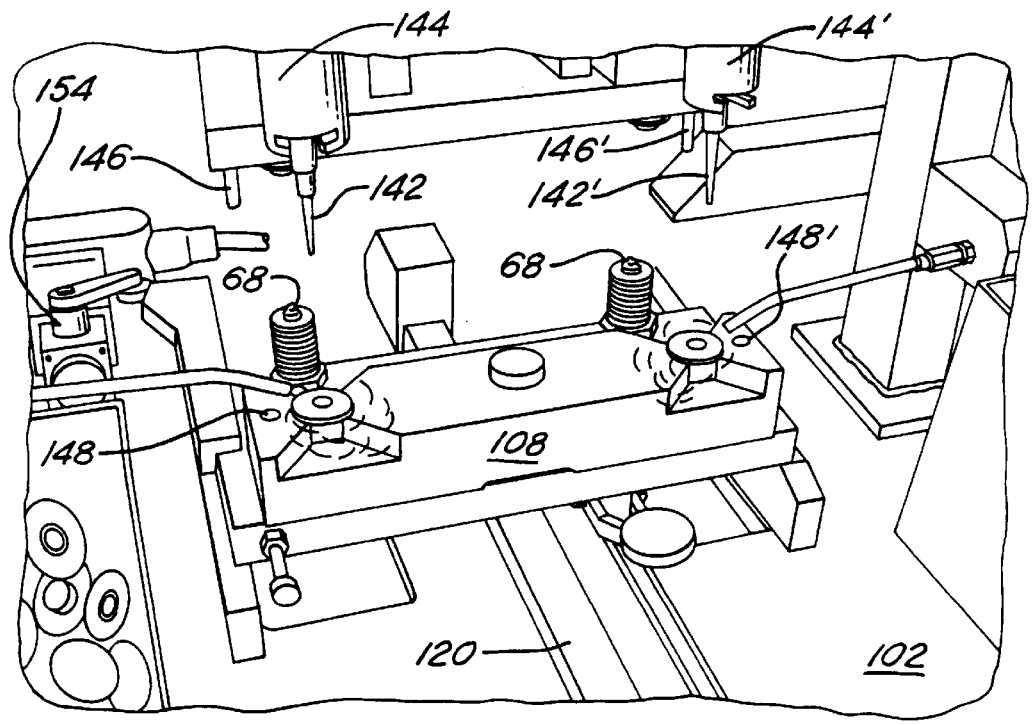
FIG. 7 is a perspective view looking down at the slide mechanism when the slide is at the filling station.
Figure 8:
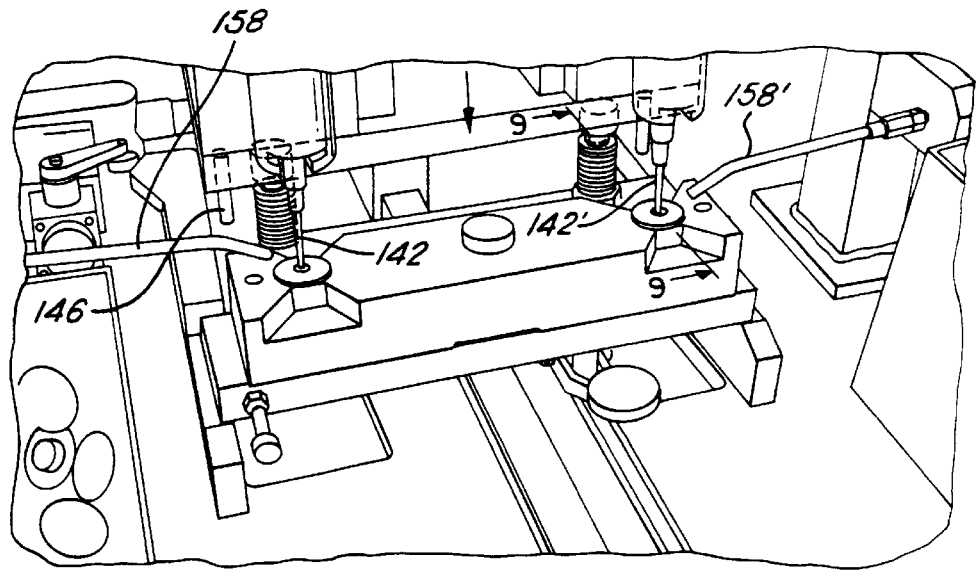
FIG. 8 is a perspective view looking down at the slide mechanism with the slide at the filling station and the adhesive filling nozzles disposed to charge the fastener reservoirs with the adhesive.
Figure 9:
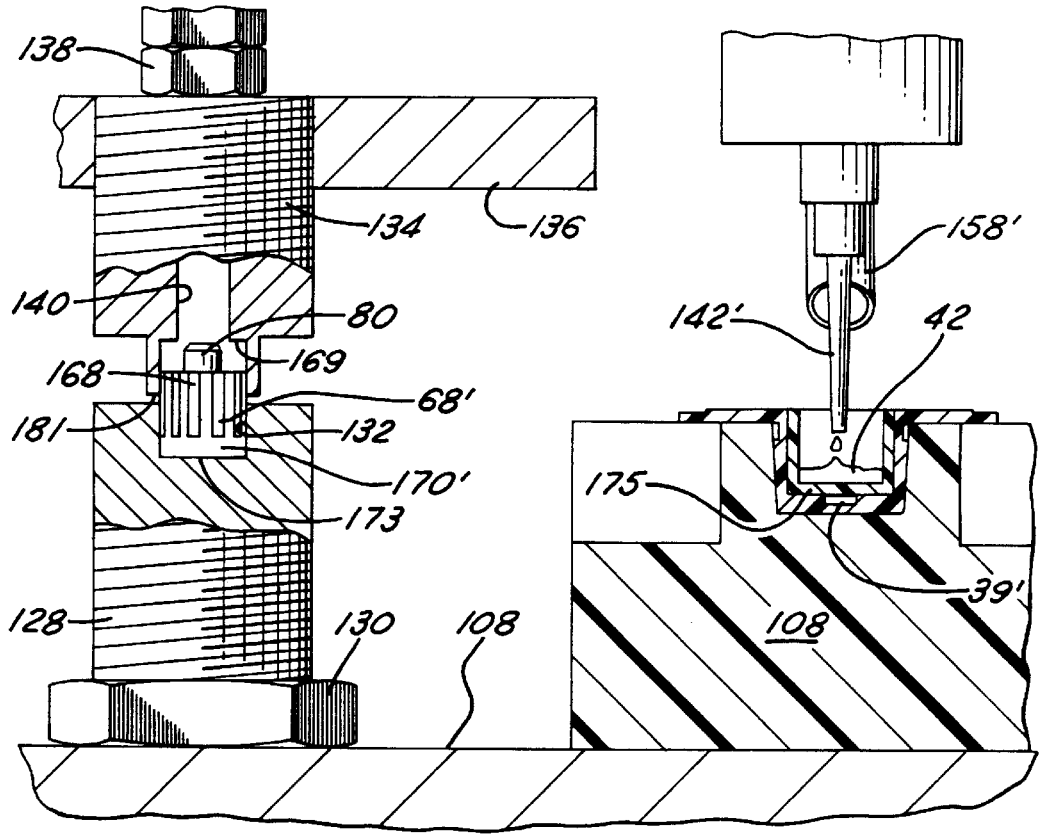
FIG. 9 is a side elevation partially in cross-section taken on the line 9—9 of FIG. 8.

Referring to FIGS. 4–7, the slide 108 is mounted on the table surface 102 for movement along a guide rail 120 from a loading position shown in FIGS. 4, 5 and 6 to a filling position shown in FIGS. 7, 8 and 9 and thence to a plunger inserting position shown in FIGS. 10, 11, 12 and 15. Also on the table 102 are conveniently located containers 122 and 122' for holding a supply of fastener bodies 20 having reservoir cups 38 already inserted in them, and containers 124 and 124' for holding a supply of plungers 68, and from each of these containers the person operating the apparatus may take fasteners 20 and plungers 68 and place in their respective locations in the slider 108.

The slider 108 moves reciprocally on the table surface 102 straddling the track 120. In its loading position shown in FIGS. 4, 5 and 6, the workman manually places a fastener body 20 in each of the two locations shown at the left and right sides of the slider. At each location, the slider has a socket 124 shaped to receive the fastener body or barrel 22 with the flange 24 overlying an upper surface 126 of the slider. It is a slip-fit between the barrel 22 and the socket 124 which positions the fastener accurately to receive the ensuing operations and yet enables it to be removed from the socket by the simple expedient of a vacuum as hereinafter explained. With the fastener bodies 20 located in the slider 108 in appropriate positions for ensuing operations, the apparatus will appear as shown in FIG. 6.

Also mounted on the slider 108 is a pair of piston supporting stanchions 128 and 128'. Each stanchion, as shown in FIG. 9, may comprise an externally threaded cylindrical member which is threadedly received in the slider 108 and by rotation of the stanchion, its height adjusted, and thereafter locked in place by a lock nut 130. The upper end of the stanchion is provided with an upwardly opening plunger or piston receiving socket 132 sized to hold a piston or plunger 68 for removal by plunger inserting fixture 134 depending from an upper platen 136. The end of a vacuum line terminates at the fitting 138 communicating with a passageway 140 in the fixture 134. The passage 140 is configured at the lower end of the fixture 134 to receive the nose 80 of the plunger 68 as well as the adjacent upper end of the plunger as shown in FIG. 9. The vacuum created within the line 138 and as delivered by the passage 140 to the piston or plunger 68 is sufficient to suck the piston upwardly from the position shown in FIG. 9 to the holding position shown in FIG. 12. The vacuum lifts or sucks the piston upwardly until it bottoms against a shoulder 169 which positions the piston with only its land 170' projecting below the lower end of the fixture 134. With the piston thus held in fixture 134, when the platen rises the piston 68 is lifted from the stanchion 128. Thereby, the piston 138 is readied for insertion in the fastener reservoir as shown in FIG. 12.

The piston is designated as 68' in FIGS. 9 and 12 because it represents a slight modification of the piston 68 shown in FIG. 1 in that it does not have a conical end but rather is flat as at 173. Similarly, it is received in a reservoir cup 38' shown in FIGS. 9 and 12 which does not have a conical end but is also flat as at 175. The fastener 20' also has a flat end 177 on the body. Such end has a recess 39' similar to recess 39 of FIG. 1 and for the same purpose. Other than these differences, the fastener and its components are substantially as described in connection with FIGS. 1 and 2.

In the loading station shown in FIG. 6, the workman not only places a fastener 20 in the left and right hand sides of the slider, but also places pistons 68 in their respective stanchions. After the fastener bodies 20 and the pistons 68 have been mounted on the slider 108, the workman depresses a slider locking lever 140 and shifts the slider from the loading position of FIGS. 4, 5, and 6 to the filling position of FIGS. 7, 8 and 9. When the filling position is reached, the lever 140, which is suitably spring-loaded, will engage a detent (not shown) to lock the slider in the filling position.

In the filling position and as shown in FIGS. 7, 8 and 9, a pair of adhesive filling nozzles or spouts 142 and 142' are mounted at the lower ends of adhesive injectors or valves 144 mounted on the upper platen 136. These valves are commercially available from Locktite Corporation under the trademark ZETA. Their function is to deliver a metered amount of adhesive through the nozzles 142 and 142' into the fastener reservoir 38 as depicted in FIG. 9. The amount of adhesive dispensed into each fastener reservoir will depend upon the amount of adhesive to be dispensed by the fastener as it is secured to its substrate, but a typical small fastener may receive approximately 0.12 grams (0.11 cubic centimeters) into the reservoir cup 38. Upon depressing safety buttons 146 and 146', the upper platen may be caused to descend to the position shown in FIGS. 8 and 9. The nozzles or spouts 142 have their lower ends received within the mouth of the reservoir cups as depicted in FIG. 9 when the upper platen descends.

A suitable fluid pressure actuator 137 is connected to the upper platen to vertically shift it. Cams 139 actuate controls for causing dispensing of the adhesive by the injectors when the platen is in the lower position.

At the same time that the nozzles 142 are depositing adhesive in the reservoir cups, the fixture 134 on the upper platen 136 is received over a piston 68 carried by the lower stanchion 128 and a vacuum is imposed on the fitting 138 which sucks the piston up into the fixture 134 so that upon the upper platen 136 rising, the piston will be withdrawn from the stanchion 128 and carried by the fixture to a position awaiting further movement of the slide 108.

Figure 10:
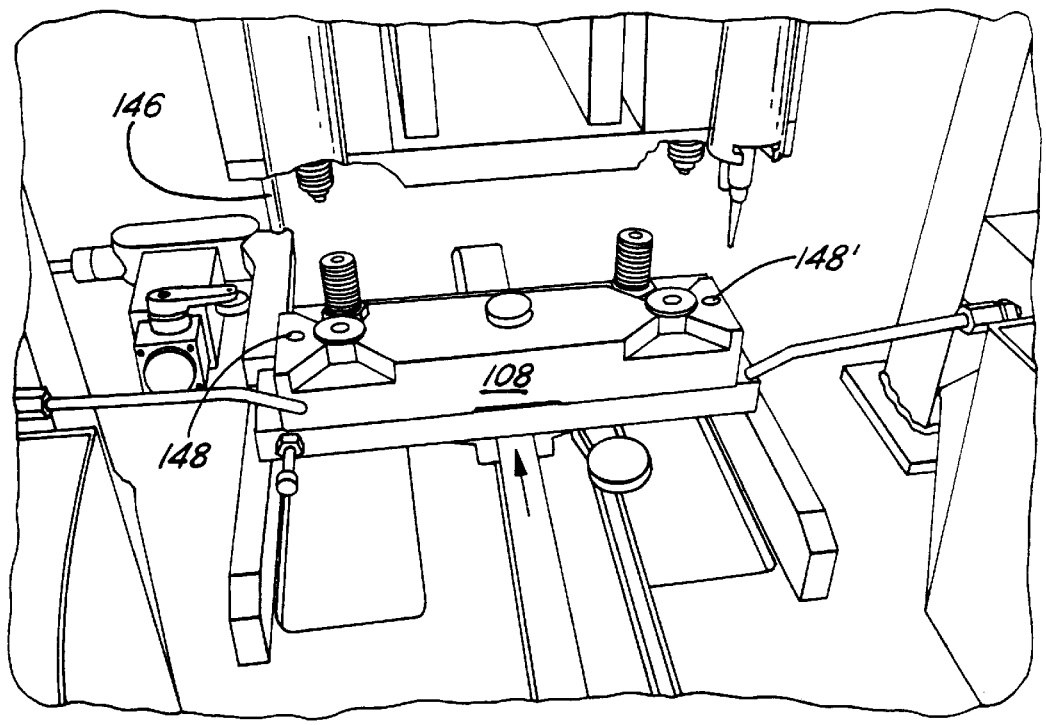
FIG. 10 is a perspective view looking down on the slide mechanism with the slide in the piston inserting station preparatory to insertion of the pistons in the fastener reservoirs.
Figure 11:
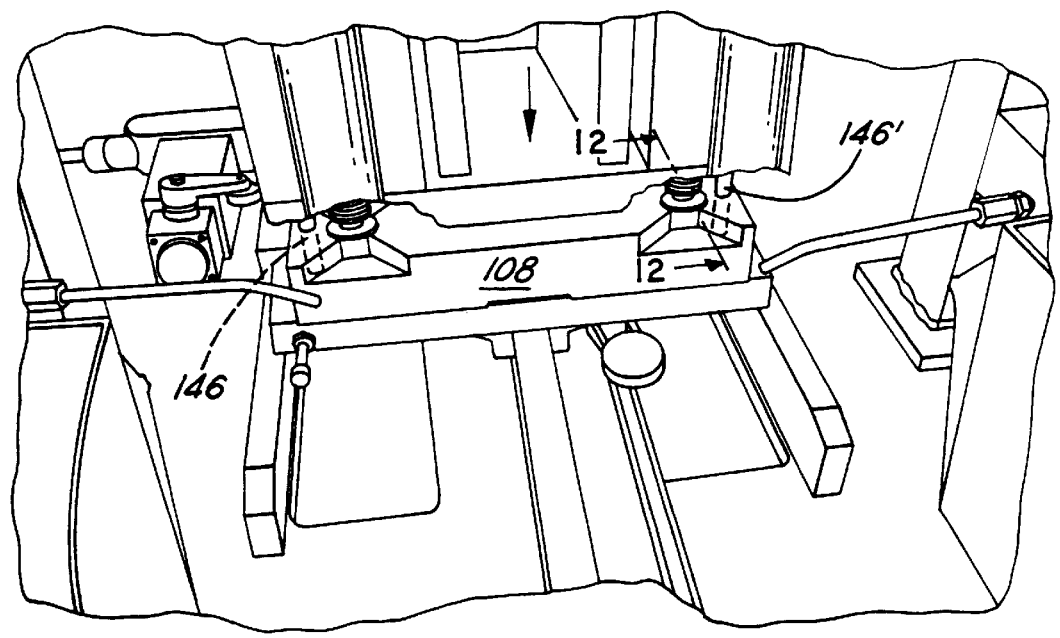
FIG. 11 is a perspective view looking down on the slide mechanism with the pistons being inserted into the fastener reservoirs.
Figure 13:
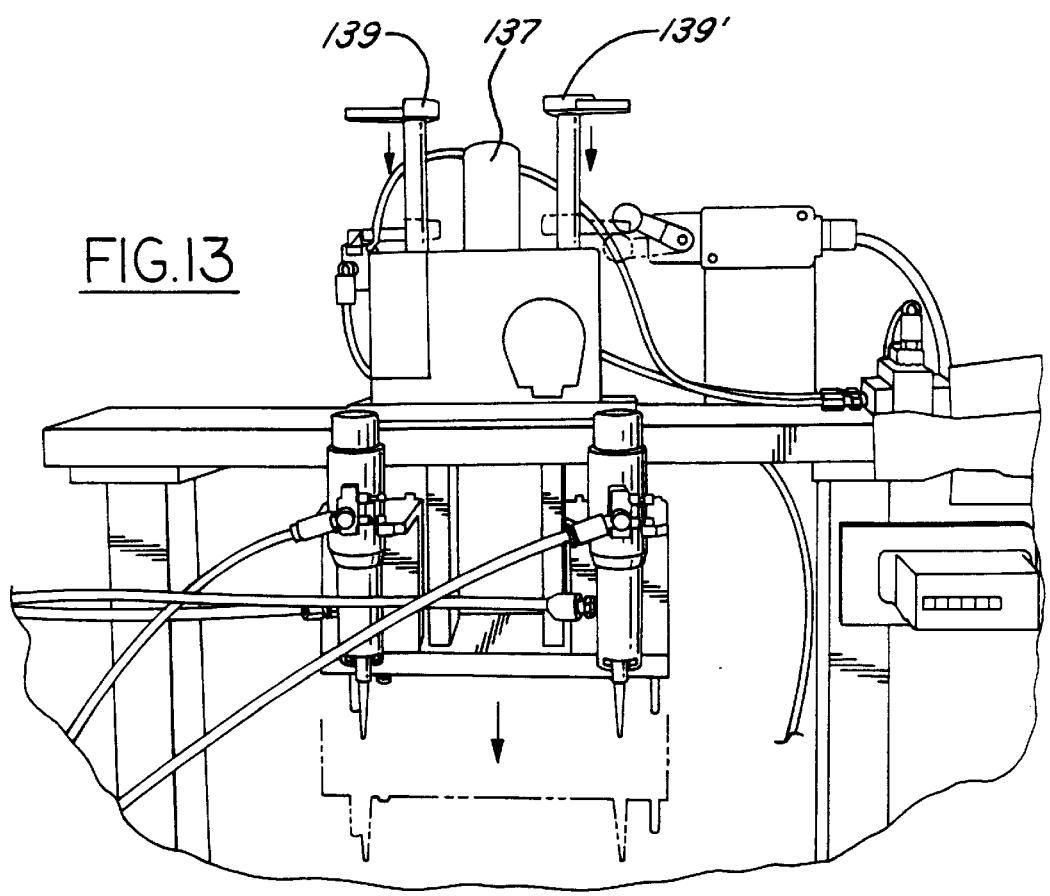
FIG. 13 is a rear elevational view of the apparatus of FIG. 3.

Upon deposit of the metered amount of adhesive in the fastener reservoirs, the platen rises and thereupon the operator again depresses the lever 140 and moves the slider to the piston inserting position shown in FIGS. 10, 11 and 12. It will be noted that at the front of the apparatus as shown in FIG. 3, safety buttons 146 and 146' are so arranged that both must be pressed by the operator of the apparatus to enable the platen to descend to the filling position. In the plunger inserting position of the slider, the slider is again locked in place by the lever 140, but in addition, because of the necessity of the very accurate alignment of the pistons 68 with the reservoir cups into which the pistons are to be inserted, alignment pins 146 and 146' are provided on the upper platen as shown in FIG. 7 which are received in alignment pin-receiving sockets 148 and 148' in the slider, as shown in FIGS. 7, 10, and 11.

As best shown in FIG. 11, the alignment pins 146 and 146' will ensure exact alignment of the piston carried by the piston inserting fixture 134 and the reservoir cups carried by the slider sockets 124. In FIG. 12, the piston 68 is shown as it is inserted within the fastener reservoir cup 38 during the downward stroke of the upper platen 136. Exact alignment is required because there is a press-fit between the plunger and the reservoir cup. The plunger is inserted so that its smooth cylindrical surface or land 70 is disposed opposite the smooth mouth wall 52 of the reservoir as more clearly shown in FIGS. 1 and 12. The lower end 181 of the fixture 134 (see FIG. 9) will bottom against the reservoir cup 38 when the piston is fully inserted as shown in FIG. 12.

The gap 64 between the outer wall of the reservoir mouth and the encircling adjacent wall of the fastener body will allow for expansion of the reservoir mouth as the plunger is inserted. With the plunger thus inserted, the adhesive within the reservoir is sealed from the atmosphere so that curing will not occur until the adhesive is expelled from the reservoir into the interface between the fastener and the substrate to which it is to be secured.

Following insertion of the plunger within the reservoir cup of the fastener, the platen 136 rises and by maintaining the vacuum in the passageways 140 and 140' and because of the press-fit of the plunger within the reservoir cups, both fasteners are lifted from their respective sockets 124 and 124' within the slider block and the workman then pulls the slider toward himself to the initial loading position of FIGS. 4, 5 and 6. When the slider returns to such loading position, a cam-operated valve switch will cause temporary pressurization of the fitting 138 to blow the loaded and assembled fastener out of the fixture 134 downwardly into a collecting bin beneath the upper surface of the table 102, as shown in FIG. 3. Control valve switches may be provided as necessary, operated by suitable cams as, for example, depicted at 154 and 156 and elsewhere as desired or needed to aid the operator in operation of the apparatus.

To ensure that the adhesive in the fastener reservoirs is not contaminated by ambient atmosphere whose water vapor content will be sufficient to initiate curing of the adhesive, we have provided for a bathing of the fasteners and pistons at the filling and plunger inserting stations by gaseous dry nitrogen as, for example, supplied from the cylinder 118. For this purpose and as shown in FIGS. 6, 7 and 8, a continuous stream of dry gaseous nitrogen is delivered to the fasteners, both prior to, during filling of the fastener reservoir cups with the adhesive and during insertion of the pistons therein. As will be noted in FIG. 9, the nitrogen gas delivery nozzle 158' is positioned adjacent the adhesive fill nozzle 142 and directs a stream of gaseous nitrogen directly into the reservoir, both before and during the filling operation. This leaves a blanket of nitrogen above the free surface of the adhesive 42 in the reservoir.

Figure 15:
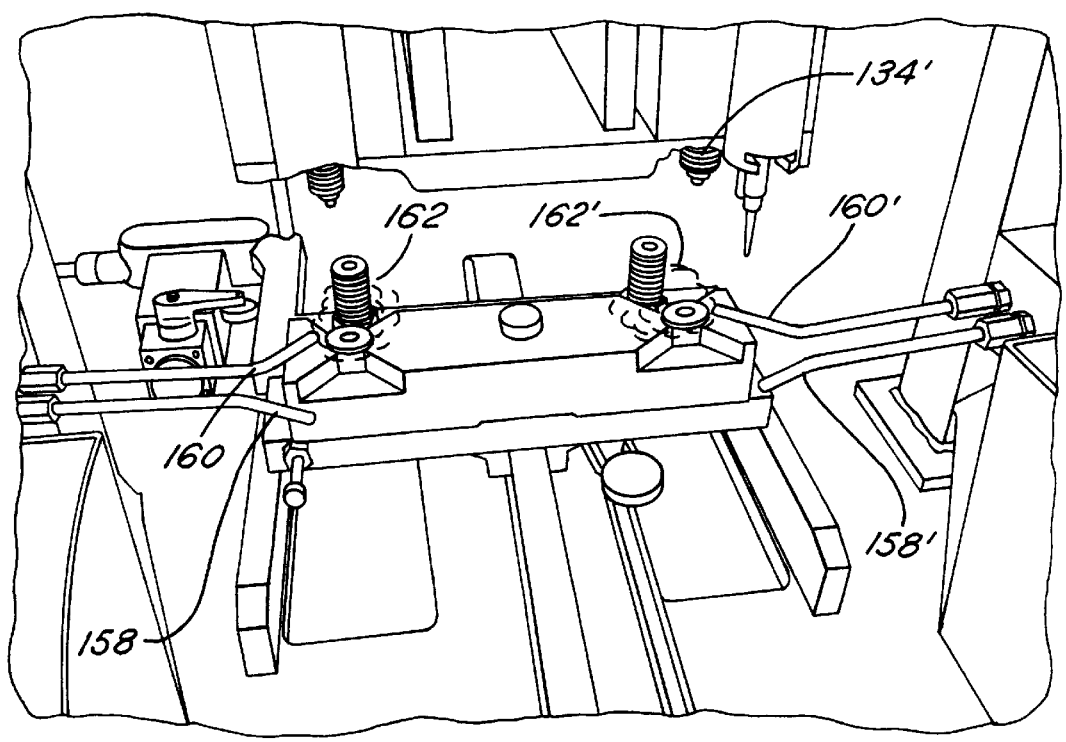
FIG. 15 is a perspective view of the slide mechanism showing a slightly modified form of the purging arrangement.

Alternatively, as shown in FIG. 15, additional nitrogen delivery nozzles 160 and 160' may be provided to bathe the fastener reservoir in the piston inserting station with gaseous nitrogen indicated at 162. Thus, at the time the plunger is inserted into the reservoir cups, nitrogen surrounds the fastener reservoir and provides for nitrogen beneath the plunger 68 as it enters the reservoir. This ensures the presence of a small bubble 44 as previously described between the upper free surface of the adhesive and the inner wall 48 of the reservoir.

We have found that it may be desirable to discontinue the stream of dry gaseous nitrogen during filling of the fastener reservoir cups with the adhesive. Therefore, nitrogen is introduced as a burst by the nozzles 158 and 158' as the slider reaches the adhesive filling position shown in FIG. 8, but is just prior to adhesive delivery. We have found that this provides for a better filling of the reservoir cups. By filling the cups with adhesive immediately after the burst of dry gaseous nitrogen, atmospheric air is essentially excluded from the cups. Of course, the dry gaseous nitrogen continues to be delivered to the filled cups when at the piston-inserting position shown in FIG. 10. Such nitrogen delivery ensures the presence of the nitrogen bubble as heretofore explained.

We have also found that it is desirable to ensure that when the slider 108 is moved to the piston-inserting position of FIG. 10 and prior to lowering the upper platen to carry the piston 68 into the adhesively-filled reservoir cup of the fastener, if a piston is in fact not present in the fixture 134, the platen will not lower. This will prevent vacuum within the fixture 134, which is intended to hold a piston in place from sucking the adhesive out of the cup and seriously contaminating the fixture and associated pneumatic lines. Therefore, in the vacuum delivery line terminating at fixture 134, there is a sensor which will sense the vacuum in the line, and should the vacuum be less than a predetermined value, the sensor will trigger an interruption in the circuitry for the safety buttons 146 and 146' so that, upon depression thereof, the upper platen will not descend. This sensor arrangement is offered by Numatics Corporation Valves of Highland Township, Mich.

Similarly, a sensor may be provided in the pneumatic lines leading to the fittings 138 and 138' for the fixtures 134 and 134' which will sense whether the fasteners have been blown out of fixtures 134 and 134' as the slider is returned to its starting position shown in FIG. 6. If there is a fastener in either fixture 134 or 134', the pressure in the lines will be much greater and this will trigger a circuit preventing the upper platen from lowering, at the commencement of the next cycle, when the safety buttons 146 and 146' are depressed so that damage to the apparatus will be avoided. Again, such sensing mechanism is available from Numatics Corporation above mentioned.

In the event a different type of adhesive is being charged into the reservoirs, such as an anaerobic, instead of nitrogen gas, oxygen may be supplied through the nozzles 158, 158', 160 and 160'.

What is claimed is:

1. The method of encapsulating quick-setting adhesive responsive to atmospheric moisture in small reservoirs from which the adhesive is dispensed comprising the steps of;

feeding a succession of the small reservoirs to a filling station free of atmospheric moisture;

depositing the adhesive in successive reservoirs in said station;

flooding the free surface of the adhesive with a gas free of atmospheric moisture to displace atmospheric moisture therefrom; and inserting a piston into the reservoir on top of the adhesive with a bubble of said gas between the adhesive and the piston, said bubble being of sufficient volume to allow subsequent displacement of the piston into the reservoir overcoming hydraulic lock to allow the adhesive to be displaced therefrom.

2. The method of encapsulating quick-setting adhesive in small hermetically sealed reservoirs from which the adhesive is dispensed upon depression of a reservoir piston sealing the mouth of the reservoirs, comprising the steps of:

feeding a succession of small reservoir cups to a filling station;

flooding the interior of each cup at the station with cure preventing gas in sufficient quantity to displace the ambient atmosphere therefrom;

immediately thereafter depositing the quick-setting adhesive into the reservoirs; and while flooding the same with said gas, inserting a piston into the reservoir on top of the adhesive with a bubble of said gas between the adhesive and the piston, said bubble being of sufficient volume to allow displacement of the piston into the reservoir overcoming hydraulic lock allowing the adhesive to be displaced therefrom.

3. The method of encapsulating quick-setting adhesive responsive to atmospheric moisture in small reservoirs from which the adhesive is to be dispensed comprising the steps of:

presenting each reservoir at a filling station in a position to receive the adhesive;

displacing moisture from the interior of the reservoir in said station;

while the reservoir is free of moisture, depositing the adhesive into the reservoir; and while flooding the free surface of adhesive in the reservoir with a moisture-free gas sufficient to displace atmospheric moisture therefrom, inserting a piston into the reservoir above the free surface and in sealed relation with the reservoir trapping a bubble of said gas between the piston and the adhesive, said bubble being of sufficient compressibility to permit subsequent displacement of the piston into the reservoir overcoming hydraulic lock and dispersing the adhesive from the reservoir.

4. The invention defined by claim 3 wherein the adhesive will cure in the presence of atmospheric water vapor and the gas flooding each cup is nitrogen.

5. The invention defined by claim 3 wherein the adhesive is an anaerobic adhesive and said gas is oxygen.

* * * * *